United States Patent
Fein et al.

Patent Number: 5,940,847
Date of Patent: Aug. 17, 1999

[54] SYSTEM AND METHOD FOR AUTOMATICALLY CORRECTING MULTI-WORD DATA ENTRY ERRORS

[75] Inventors: Ronald A. Fein; Leopoldo Artalejo, IV, both of Seattle; Dale L. Gipson, Redmond, all of Wash.

[73] Assignee: Microsoft Corporation, Redmond, Wash.

[21] Appl. No.: 08/791,181

[22] Filed: Jan. 31, 1997

Related U.S. Application Data

[63] Continuation-in-part of application No. 08/482,194, Jun. 7, 1995.

[51] Int. Cl.$^6$ .................................................... G06F 17/21
[52] U.S. Cl. .................................................... 707/540
[58] Field of Search ............................ 707/540, 533, 707/529, 532; 434/169; 382/187

[56] References Cited

U.S. PATENT DOCUMENTS

| | | | |
|---|---|---|---|
| 4,864,502 | 9/1989 | Kucera et al. | 364/419 |
| 4,873,634 | 10/1989 | Frisch et al. | 364/419 |
| 5,802,205 | 9/1998 | Emico et al. | 382/187 |

*Primary Examiner*—Joseph H. Feild
*Assistant Examiner*—Alford W. Kindred
*Attorney, Agent, or Firm*—Jones & Askew, LLP

[57] ABSTRACT

An editing system operable for automatically detecting and correcting multi-word data entry errors. A standard list including a plurality of source-target pairs is provided as an integral part of an editing program suitable of operation on a conventional personal computer. Each source term is a common multi word data entry error, and each target term is a correction for a corresponding source term. Each user may create a customized substitution list by adding user-defined source-target pairs to the list, and deleting source-target pairs from the list. In addition to correcting common multi-word spelling and grammatical errors, the substitution list may be used to perform other functions such as substituting a symbol for a multi-word alias typed with a standard keyboard. The substitution list may optionally be implemented in connection with an "AUTOCORRECT" engine that implements multi word substitutions as they are typed by a user. In this case, automatically substitutions arc highlighted in the document displayed to the user. The user my easily reverse an undesired automatic substitution by selecting an "undo" menu item from a tool bar. A convenient user interface is also provided for accessing the substitution list. Convenient tool bars and menu items for activating the user interface.

20 Claims, 6 Drawing Sheets

FIG. 1

| REPLACE | WITH |
|---|---|
| gorilla warfare | guerrilla warfare |
| your a | you're a |
| wreck havoc | wreak havoc |
| ⋮ | ⋮ |

FIG. 2A

| REPLACE | WITH |
|---|---|
| be quit | be quiet |
| oft he | of the |
| int he | in the |
| ⋮ | ⋮ |

FIG. 2B

| REPLACE | WITH |
|---|---|
| everyone's else | everyone else's |
| it's name | its name |
| there's is | theirs is |
| ⋮ | ⋮ |

FIG. 2C

| REPLACE | WITH |
|---|---|
| would of been | would have been |
| might of had | might have had |
| will of had | will have had |
| ⋮ | ⋮ |

SYSTEM AND METHOD FOR AUTOMATICALLY CORRECTING MULTI-WORD DATA ENTRY ERRORS

REFERENCE TO RELATED APPLICATION

This application is a continuation-in-part of the commonly owned pending U.S. patent application Ser. No.08/482,194, "Method and System for Interactive Formatting of Word Processing Documents" filed Jun. 7, 1995, inventor Dale Gipson.

TECHNICAL FIELD

The present invention relates to computer-implemented editing systems and, more particularly, relates to a system and method for automatically correcting multi-word data entry errors.

BACKGROUND OF THE INVENTION

Generally stated, a computer-implemented editing system is a system operable for creating and altering electronic documents such as letters, statistical analyses, e-mail messages, flow-charts, and the like. There are a wide variety of editing programs available that allow conventional personal computers to function as sophisticated computer-implemented editing systems. For example, specialized editing programs are available for creating and altering word processing documents, spreadsheets, databases, e-mail messages, and audio-visual presentations. Developing and selling various types of editing programs is a highly competitive market. The participants in this market therefore continually strive to develop innovations for their editing programs that the purchasing public finds desirable.

Two types of innovations have been particularly successful in the market for editing programs. The first type are innovations that help users create error free documents, such as spelling and grammar correction utilities. The second type are innovations that make editing systems easier and faster to use, such as tool bars, pop-up windows, pull-down menus, and other types of user-friendly interfaces. Despite the efforts of program developers to improve these aspects of editing programs, significant drawbacks persist in the operation of conventional editing programs.

To illustrate one such drawback of conventional editing programs, consider a word processing program with a post-processing spelling correction utility. To use this type of editing system, an author types all or part of a document. The author may stop the data input process at any point and invoke a spelling correction utility. This utility scans the document word by word and compares each word to the words in the program's spelling dictionary. The spelling correction utility stops scanning when it encounters a word that is not found in the program's spelling dictionary, which word the utility tags as a potentially misspelled word. The potentially misspelled word is typically displayed to the author in a spelling correction user interface, such as a pop-up window, along with a set of selectable options offering likely choices for correct spellings taken from the program's spelling dictionary. The spelling correction user interface typically includes a number of selectable menu items, such as "replace," "replace all," "ignore," "ignore all," "delete," and "add to spelling dictionary." The author must then interact with the user interface, for example by selecting one of the menu items, before the spelling correction utility continues scanning through the document.

This type of spelling correction utility can be cumbersome to use because user interaction is required before the document is altered. Consider, for example, a document that includes the data pattern "int he." The data entry "int he" is almost certainly a data entry error for "in the." It would therefore be convenient for the spelling correction utility to recognize the data pattern "int he" as a potential misspelling and to provide the user with a selectable option to replace "int he" with "in the." The conventional spelling correction utility, however, identifies the word "int" as a misspelling, and provides the user with a selectable option to replace all instances of "int" with "in." If the user selects to replace all instances of "int" with "in," the text is left reading "in he" instead of "in the," which is not what the user wants. Moreover, the spelling correction utility is subsequently unable to detect the phrase "in he" as a data entry error because both words "in" and "he" correspond to valid words in the spelling dictionary. The user must therefore go through the process of searching throughout the document for occurrences of "in he" and manually changing the text to read "in the" in each instance. Most users find this to be an aggravating and time consuming process.

Another shortcoming of these conventional editing programs is that certain data patterns that are almost certainly data entry errors go undetected. This happens when each word of the data entry corresponds to a valid spelling, and there are no grammatical errors that can be detected by the grammar correcting utility. Sometimes, a data entry error of this type results from a very simple typing error that produces an erroneous data pattern that conveys an unfortunate and potentially embarrassing meaning. For example, a user may type "diner time" intending to type "dinner time." Both a conventional spelling correction utility and a conventional grammar correction utility will not detect this particular error. To make matters worse, this type of error is precisely the type that humans find difficult to pick up when proof reading. As a result, this type of data entry error often goes undetected. Other potentially embarrassing data entry errors of this type include "wreck havoc" for "wreak havoc," and "the baby's basinet" [a medieval helmet] for "the baby's bassinet." Errors of this type are so easy to make inadvertently and then overlook when proof reading that they occur with disturbing regularity.

Another shortcoming of conventional editing programs is that they do not detect certain data entries that may well be what the user intended to type, but are nevertheless almost certainly incorrect. This type of data entry error may be particularly troublesome for an author having a less-than-perfect grasp of English syntax, such as an author for whom English is a second language. For example, many people are simply unaware the correct usage of "its" and "it's" due to its (not it's) unusual possessive form. Time after time, a user may type incorrect phrases such as "it's name." Similarly, the terms "your" and "you're" are frequently used incorrectly. Other examples of common errors of this type are "gorilla warfare" for "guerrilla warfare," "might of been" for "might have been," and "when ever" for "whenever." Human languages are, in these and many other instances, very tricky. Although these data entries may be correct in very rare circumstances, they are almost always erroneous. It would therefore be desirable for an editing system to be operable for detecting data entry errors of this type.

Yet another shortcoming of conventional editing programs is that they inefficiently handle a large class of data patterns that are, more likely not, data entry errors. For this class of data patterns, even if the editing program detects the data pattern and suggests the most likely correction, a relatively large number of user interactions are required to confirm the corrections. A smaller number of user interactions would be required, for example, if the editing program could automatically correct these data patterns. User interaction could then be reserved for the relatively small number of instances in which the author intends the data patterns and must therefore reverse the automatic corrections.

To illustrate, consider the data pattern "revelant." Assume that an author has typed this data pattern in ninety-nine documents intending to type "relevant," and that in one document (e.g, when the author was writing a document describing recurring spelling errors) the author actually intended to write "revelant." For an editing program that requires user interaction to confirm suggested corrections, user interaction is required in ninety-nine documents to confirm the correction of "revelant" to "relevant." For an editing program that makes this correction automatically, on the other hand, user interaction is only required to reverse the automatic correction (i.e., to return "relevant" to "revelant") in the one document that the user actually intended to write "revelant." An automatic correction utility would thus greatly reduce the number of user interactions.

There is, therefore, a need for an improved editing system that detects and corrects common data entry errors that are not detected by conventional editing systems. There is also a need for an improved editing system that automatically corrects common data entry errors that are not detected by conventional editing systems.

SUMMARY OF THE INVENTION

The present invention meets the needs described above by providing an editing system operable for correcting a predefined set of multi-word data entry errors. A user may customize his or her editing system by augmenting the predefined set with user-defined multi-word data entry errors. According to the present invention, the predefined set of multi-word data entry errors may be corrected automatically as they are typed into a document by a user. An automatically corrected data pattern is highlighted and may be easily reversed by the author, for example, by selection of an "undo" menu item. In this case, the reversed data pattern may be automatically deleted from the predefined set of multi-word data entry errors.

Generally described, the present invention provides a substitution list including a plurality of source-target pairs. The substitution list allows the source terms to be detected in electronic documents and replaced with the corresponding target terms. A standard substitution list is provided as an integral part of an editing program suitable of operation on a conventional personal computer. Each source term may be a common multi-word spelling or grammatical error, and each target term may be a correction for a corresponding source term. Each user may create a customized substitution list by adding user-defined source-target pairs to the list, and deleting source-target pairs from the list. In addition to correcting common multi-word spelling and grammatical errors, the substitution list may be used to perform other functions, such as substituting a symbol for a multi-word alias typed with a standard keyboard. A convenient user interface is provided for accessing the substitution list, and convenient tool bars and menu items are provided for activating the user interface.

More specifically described, the present invention provides a method for altering the content of a current file in a computer system including a processing unit, a memory storage device, a user input/output system including a monitor, and an editing program module. A plurality of characters are received from the user input/output system. A delimiter character is detected among the plurality of characters. In response to detecting the delimiter character, a multi-word source term of a source-target pair including the source term and a target term is retrieved from the memory storage device. The source term is compared to a multi-word set of characters immediately preceding the delimiter character. If the source term matches the set of characters immediately preceding the delimiter character, then the target term is retrieved from the memory storage device. In the current file, the set of characters immediately preceding the delimiter character is replaced with the target term.

According to an aspect of the present invention, a portion of the current file including the plurality of characters received from the user input/output system is displayed on the monitor. Within the display, the set of characters immediately preceding the delimiter character is replaced with the target term. Optionally, the target term may be highlighted.

According to another aspect of the present invention, the source term is a first source term relating to a first common data entry error, and the target term is a first target term including a correction for the first common data entry error. If the first source term does not match the multi-word set of characters immediately preceding the delimiter character, then a second source term is retrieved from the memory storage device relating to a second common data entry error. The second source term is compared to the multi-word set of characters immediately preceding the delimiter character. If the second source term matches the multi-word set of characters immediately preceding the delimiter character, then a second target term associated with the second source term is retrieved from the memory storage device, the second target term including a correction for the second common data entry error. In the current file, the multi-word set of characters immediately preceding the delimiter character is replaced with the second target term.

The target term may include a multi-word set of characters. The target term may also include a symbol. The source term may include a common grammatical error, and the target term may include a correction for the common grammatical error. The source term may include a common contextual error, and the target term may include a correction for the common context error. The source term may include a common possessive form error, and the target term may include a correction for the common possessive form error. The source term may include a common inadvertent data entry error, and the target term may include a correction for the common inadvertent data entry error. The source term may include a common spelling error, and the target term may include a correction for the common spelling error. It will be appreciated that many other classes of source-target pairs may be defined in accordance with the present invention.

DETAILED DESCRIPTION OF THE PREFERRED EMBODIMENT

The disclosed embodiment of the present invention provides an editing system operable for detecting and correcting multi-word data entry errors. The disclosed embodiment may be implemented in connection with a word processing program including a post-processing spelling correction utility. But the preferred embodiment of the present is implemented as a integral part of an "AUTOCORRECT" engine that implements multi-word substitutions as they are typed by a user. In particular, the preferred "AUTOCORRECT" engine is described in the commonly owned pending U.S. patent application Ser. No.08/482,194, "Method and System for Interactive Formatting of Word Processing Documents" filed Jun. 7, 1995, inventor Dale Gipson, which is incorporated by reference. Commercial embodiments of the present invention may be implemented in connection with a wide variety of editing program modules, such as word processing program modules, spreadsheet program modules, presentation system program modules, etc. Specifically, it is anticipated that commercial embodiments of the present invention will be implemented as integral parts of "WORD 97," "EXCEL 97," "POWERPOINT 97," "PROJECT 97," and "ACCESS 97," all manufactured by Microsoft Corporation, assignee of the present invention.

The following detailed description is presented largely in terms of processes and symbolic representations of operations of data bits manipulated by a processing unit and maintained within data structures supplied by one or more memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purposes of this discussion, a method or process is generally conceived to be a sequence of computer-executed steps leading to a desired result. These machine-implemented steps, which can be maintained as in the form of a program module, generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, numbers, records, files, or the like. It should be kept in mind, however, that these and similar terms should be associated with appropriate physical quantities for computer operations, and that these terms are merely conventional labels applied to these physical quantities that exist within the computer.

In addition, it should be understood that the programs, processes, methods, etc., described herein are not related or limited to any particular computer, single chip processor, or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

THE OPERATING ENVIRONMENT

Figure 1:
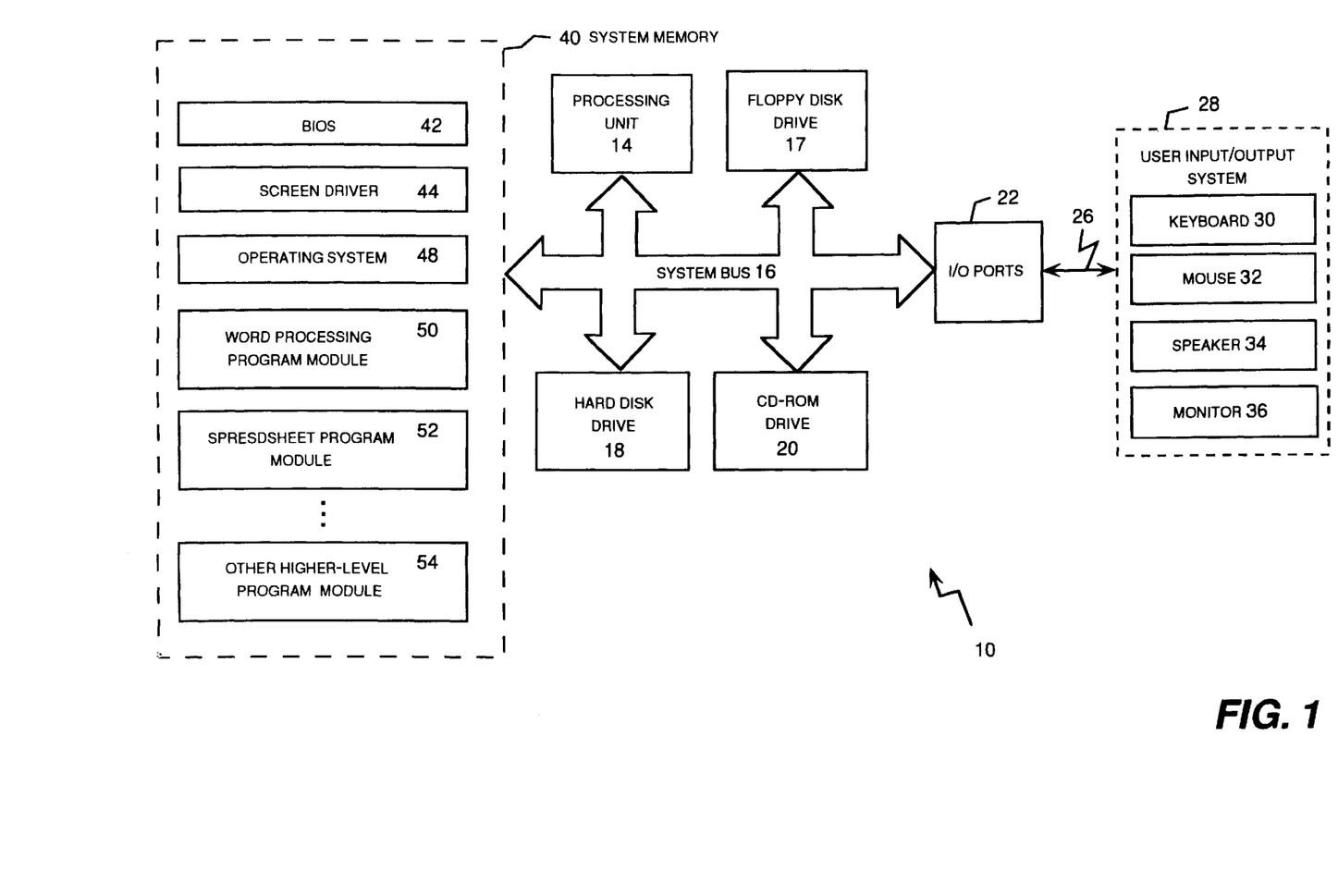
FIG. 1 is a functional block diagram of a conventional personal computer system that provides the operating environment of a disclosed embodiment of the present invention.

FIG. 1 is a functional block diagram of a conventional personal computer system 10 that provides the operating environment of a disclosed embodiment of the present invention. The personal computer system 10 may be any of a variety of personal computers such as "IBM," "IBM"-compatible, or "APPLE" personal computers. The computer system 10 includes a processing unit 14 connected by way of a system bus 16 with internal I/O devices including a floppy disk drive 17, hard disk drive 18, and a CD-ROM drive 20. The system bus 16 also connects the processing unit 14 with I/O ports 22 that are used to connect the computer system 10 with a plurality of external I/O devices. In particular, the I/O ports 22 are connected by way of a cable connector 26 with a user input/output system 28 including a keyboard 30, mouse 32, speaker 34, and monitor 36. It will be appreciated that additional input/output devices such as a joy stick (not shown), touch-screen (not shown), voice response unit (not shown), and the like may also be included as part of the user input/output system 28. It will also be appreciated that embodiments of the present invention may be implemented on other types of computer platforms, such as a distributed "Internet computer," or a "workstation," etc.

The processing unit 14 is also connected by way of the system bus 16 to a system memory 40, typically a Read Only Memory (ROM) resource and a random access memory (RAM) resource of at least about eight megabytes, although embodiments of the present invention may be implemented on platforms having significantly less RAM. The processing unit 14 communicates by means of control, address, and data signals with the software resident within system memory 40. The computer system 10 has a distinct hierarchy of software retained in the system memory 40 that controls the operation of the system at all times. Communications generally occur only between adjacent levels in the hierarchy, although there are some exceptions.

The hardware, primarily the processing unit 14 and the system memory 40, is at the lowest level in the hierarchy. External I/O devices, such as the user input/output system 28, are controlled by the basic input-output system (BIOS) 42, which is at the next level in the hierarchy. The BIOS 42 writes or reads bytes of information to or from memory address ports. A memory address port is a predefined location within the system memory 40 that is dedicated to communicating with an external device such as the monitor 36, a printer, a modem, or the like.

The BIOS 42 is usually located on a ROM (not shown) and is specific to the computer that it supports. The BIOS 42 operates as an interface between the processing unit 14 and the operating system 48 by receiving instructions from the operating system and translating the instructions into manipulation of the memory address ports. The BIOS 42 provides a uniform interface between the computer's operating system software and the specific hardware configuration of a particular computer, primarily the processing unit 14 and the system memory 40, allowing standardization of operating system instructions used to control the hardware of different computers.

Device drivers that support external I/O devices operate at the next level in the hierarchy. For example, the screen driver 44 is specifically configured to communicate with the monitor 36. The screen driver 44 responds to the presence of data placed in a predefined memory address port by the BIOS 42. Specifically, the screen driver 44 transmits that data from the predefined memory address to the monitor 36 in the particular protocol required by the monitor 36 so that the data is displayed properly on the screen. Other device drivers similarly support the other I/O devices: a floppy disk driver supports the floppy disk drive 17, a hard disk driver supports the hard disk drive 18, a CD-ROM driver supports the CD-ROM drive 20, etc.

A standardized operating system 48 operates at the next level in the hierarchy. The preferred embodiment of the present invention operates in conjunction with a variety of operating systems including "WINDOWS NT" and "WINDOWS 95" manufactured by Microsoft Corporation, Redmond, Wash., the "MACINTOSH" operating system, etc. The operating system 48 is usually installed in a mass-storage computer memory such as the hard disk drive 18. During boot up (initialization) of the computer system 10, the operating system 48 and the device drivers such as the screen driver 44 are loaded into the system memory 40, usually from the hard disk drive 18. The operating system 48 provides the interface between the processing unit 14 and other higher level modules such as task-specific program modules. Generally, higher level program modules issue instructions, whereas the operating system 48 controls the operation of the processing unit 14 so that these instructions are processed in an orderly manner.

Task-specific program modules operate at the next level in the hierarchy to perform specialized functions. During operation of the computer system 10, one or more task-specific program modules are loaded into system memory 40, usually from the hard disk drive 18, the CD-ROM drive 20, or other memory storage devices. In performing their specialized functions, the task-specific program modules send I/O instructions to the operating system 48. In response, the operating system 48 sends I/O instructions to the BIOS 42, which implements the instructions by writing data to or reading data from a memory address port. The screen driver 44 then transport the data from the memory address port to the monitor 36 to create a screen display.

The operating system 48 provides a variety of functions, services, and interfaces that allow task-specific program modules to easily deal with various types of I/O. This allows the task-specific program modules to issue relatively simple function calls that cause the operating system 48 to perform the steps required to accomplish various tasks, such as displaying information on the monitor 36, printing text on an attached printer, or transmitting data between task-specific program modules. Common task-specific program modules such as word processing program modules, spreadsheet program modules, database program modules, presentation system program modules, and the like allow conventional computers, such as the computer system 10, to operate as sophisticated editing systems for creating documents such as letters, statistical analyses, e-mail messages, flow-charts, etc. The disclosed embodiments of the present invention, which are described in detail below, provide multi-word data substitution utilities that are suitable for implementation as integral parts of these editing systems.

THE DISCLOSED EMBODIMENTS OF THE PRESENT INVENTION

FIG. 2, including FIGS. 2A–2D, illustrates four types of substitution lists including source-target pairs for correcting common data entry errors. A grid-type substitution list user interface 200 shown in FIGS. 2A–2D may be displayed on the monitor 36 to provide a simple yet effective user interface for viewing and editing a substitution list 201. The substitution list user interface 200 typically displays a small portion of the substitution list 201 and includes a plurality of selectable control items, as is well known to those skilled in the art. In particular, the substitution list user interface 200 includes a control item that allows a user to scroll through the entire substitution list 201, such as a conventional scroll bar. The substitution list user interface 200 also includes control items that allow a user the save the substitution list 201 after changes have been made, or to discontinue the user interface 200 without saving changes, such as conventional "OK" and "cancel" buttons. Other conventional user interface control items, such as a "help" button, a window sizing button, etc. may also be included in the grid-type user interface 200.

The substitution list 201 includes a plurality of source-target pairs. The "REPLACE" header 202 indicates that the source terms of the source-target pairs are displayed in a left hand column of the substitution list user interface 200. The "WITH" header 204 indicates that the target terms of the source-target pairs are displayed in a right hand column of the substitution list user interface 200. The source and target terms of a source-target pair are displayed side-by-side in a row of the substitution list user interface 200.

The source-target pairs (i.e., rows) of the substitution list 201 are preferably searched in accordance with the dynamic "tree" structure described in the commonly owned pending U.S. patent application Ser. No. 08/482,194, "Method and System for Interactive Formatting of Word Processing Documents" filed Jun. 7, 1995.

Each editing program configured to implement the present invention comes with a standard pre-programmed substitution list. The pre-programmed substitution list presently considered appropriate for commercial embodiments of the present invention is show in Table I at the end of this specification. The following examples illustrate certain classes of source-target pairs, and these examples may or may not be included in the pre-programmed substitution list show in Table I. The pre-programmed substitution list provides a starting point from which each user may develop a customized substitution list by adding user-defined source-target pairs to the substitution list, and by deleting source-target pairs from the substitution list. Furthermore, the standard substitution list may be changed from time-to-time in response to feedback from purchasers of the editing programs. Although Table I only lists source-target pairs having multi-word source terms, it should be understood that a substitution list may also include source-target pairs having single-word source terms.

Figure 2A:
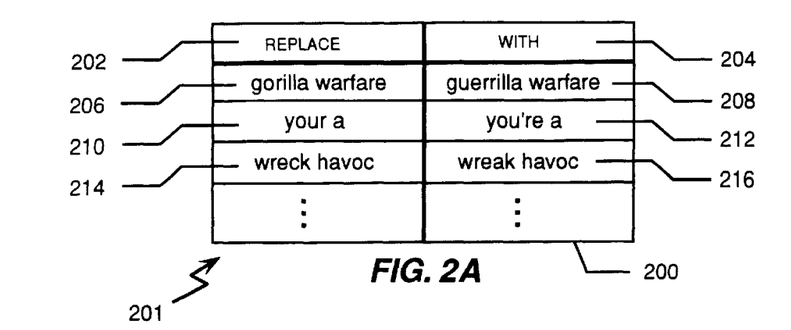
FIG. 2A is a diagram illustrating a substitution list including source-target pairs for correcting common contextual data entry errors.

FIG. 2A is a diagram illustrating a substitution list including source-target pairs for correcting common contextual data entry errors. The propriety of the source terms of this class of source-target pairs can only be determined from the context in which they occur. The source-target pairs shown in FIG. 2A are not detected by conventional spelling correction utilities because each word corresponds to a valid spelling. Three illustrative examples are shown: the source term 206 "gorilla warfare" is associated with the target term 208 "guerrilla warfare"; the source term 210 "your a" is associated with the target term 212 "you're a"; and the source term 214 "wreck havoc" is associated with the target term 216 "wreak havoc." The source terms of this class of source-target pairs might very well be what an author intended to type, but are nevertheless, more likely than not, erroneous. For example, there will be very few instances in which an animal psychologist is actually describing "gorilla warfare." Source-target pairs of this class may therefore be included in the substitution list 201. The occasional animal psychologist, of course, can easily delete the "gorilla warfare" source-target pair from his or her substitution list.

Figure 2B:
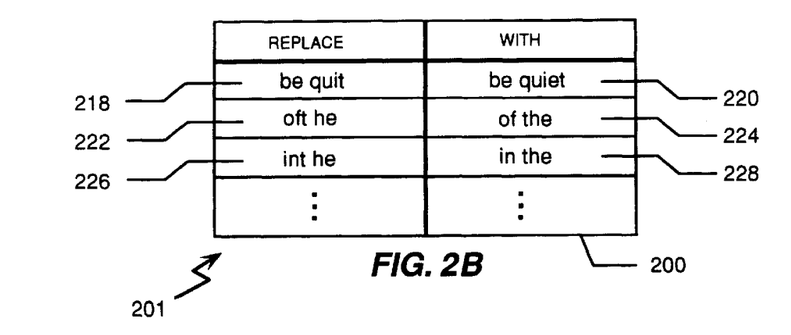
FIG. 2B is a diagram illustrating a substitution list including source-target pairs for correcting common inadvertent data entry errors.

FIG. 2B is a diagram illustrating a substitution list including source-target pairs for correcting common inadvertent data entry errors. The source terms of this class of source-target pairs can be easily typed inadvertently, for example by inserting or deleting a single letter, or by inserting a hard space in the wrong place. Three illustrative examples are shown: the source term 218 "be quit" is associated with the target term 220 "be quiet"; the source term 222 "oft he" is associated with the target term 224 "of the"; and the source term 226 "int he" is associated with the target term 228 "in the." The source terms of this class of source-target pairs are almost certainly data entry errors. For example, there will be very few instances in which an author is writing in old English and intentionally types "oft he." Source-target pairs of this class may therefore be included in the substitution list 201.

Figure 2C:
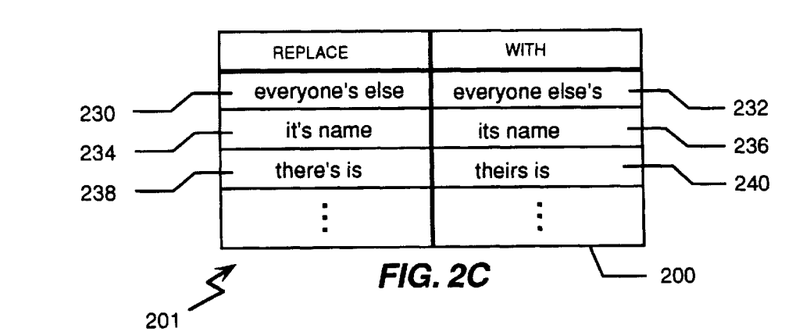
FIG. 2C is a diagram illustrating a substitution list including source-targetpairs for correcting common possessive form data entry errors.

FIG. 2C is a diagram illustrating a substitution list including source-target pairs for correcting common possessive form data entry errors. Possessive form errors occur frequently because English possessive form rules are somewhat arcane and, in some instances, very tricky. The source terms may therefore occur because an author is unaware of the correct possessive form rule. Three illustrative examples are shown: the source term 230 "everyone's else" is associated with the target term 232 "everyone else's"; the source term 234 "it's name" is associated with the target term 236 "its name"; and the source term 238 "there's is" is associated with the target term 240 "theirs is." The source terms of this class of source-target pairs are almost always erroneous, except in the very few instances in which an author is describing common possessive form errors. Source-target pairs of this class may therefore be included in the substitution list 201.

Figure 2D:
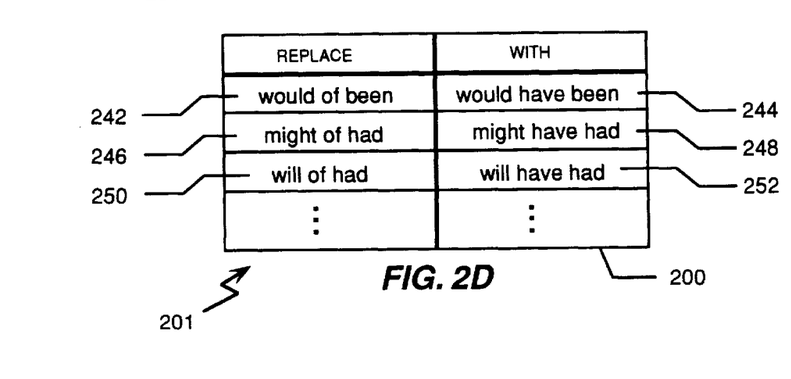
FIG. 2D is a diagram illustrating a substitution list including source-target pairs for correcting common three-word data entry errors.

FIG. 2D is a diagram illustrating a substitution list including source-target pairs for correcting common three-word grammatical errors. Three illustrative examples are shown: the source term 230 "would of been" is associated with the target term 232 "would have been"; the source term 234 "might of had" is associated with the target term 236 "might have had"; and the source term 238 "will of had" is associated with the target term 240 "will have had." The source terms of this class of source-target pairs are almost always erroneous. Source-target pairs of this class may therefore be included in the substitution list 201.

Figure 3:
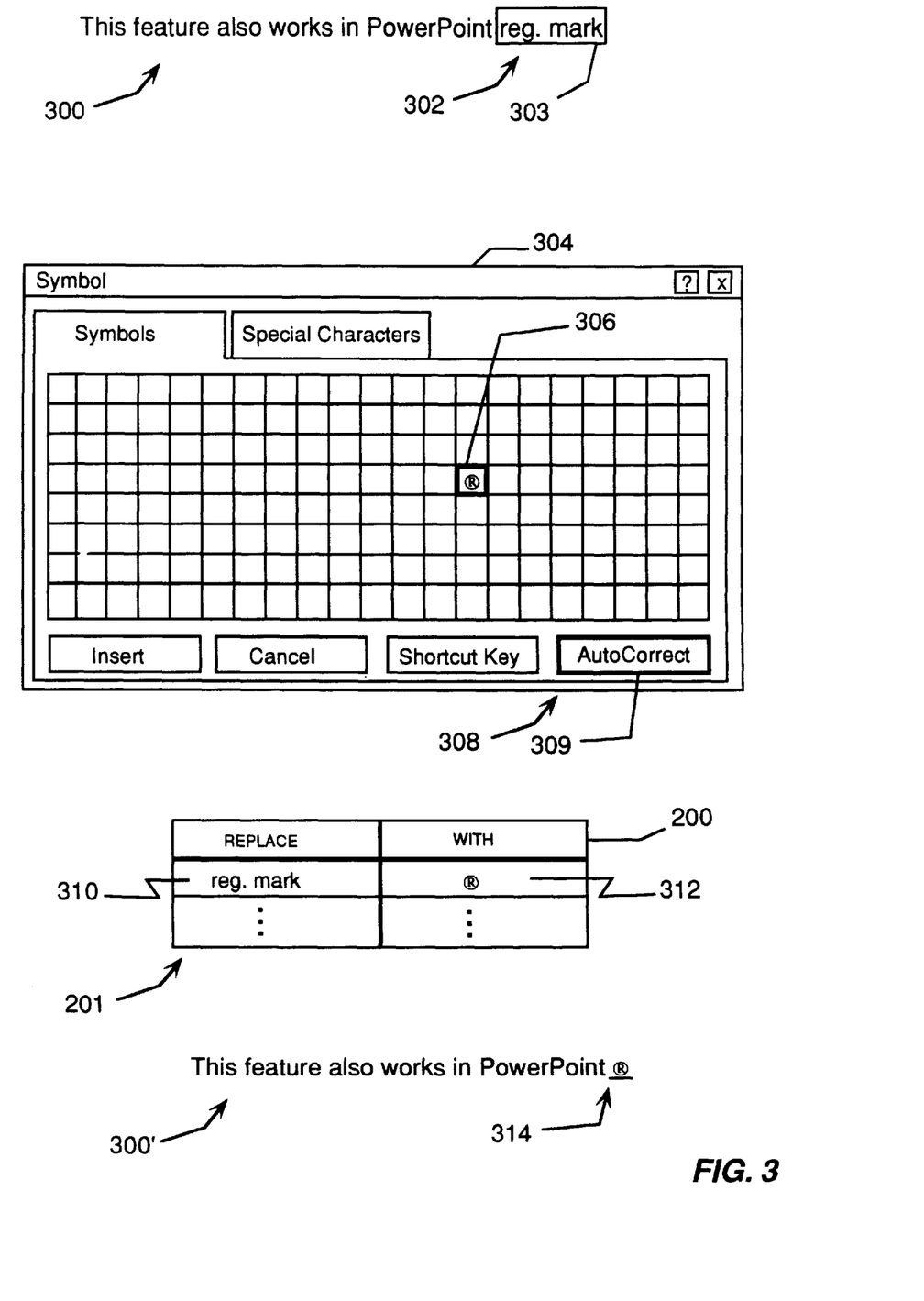
FIG. 3 is a diagram illustrating the creation of a user-defined source-target pair for a substitution list using a symbols user interface.

FIG. 3 is a diagram illustrating the creation of a user-defined source-target pair for the substitution list 201 using a symbols user interface. This procedure may be used to automatically make changes that would otherwise would require several key strokes or point-and-click commands, such as replacing a word with an intended symbol or adding accent symbols to a word like déjà vu. Assume for this example that a user's substitution list does not include a source-target pair for the source term "reg. mark." In this example, the user intentionally types the data pattern "reg. mark" intending to add a source-target pair for this data pattern to his or her substitution list as an alias for the symbol ®. The character string 300 illustrates the text "this feature also works in PowerPoint reg. mark." typed by the user into a current file. The user sets the focus to the term 302 (reg. mark) in the current file, as indicated by the focus indicator 303 (box).

The user then selects a control item to activate the symbols utility, which causes the symbols user interface 304 to be displayed on the monitor 36. The symbols user interface 304 includes a plurality of symbols that may be selected for insertion into the current file. The symbols user interface 304 also includes an "AUTOCORRECT" menu item 308. The user then selects the desired symbol 306 (®) and then selects the "AUTOCORRECT" menu item 308, as indicated by the focus indicator 309 (bold box). Selecting the "AUTOCORRECT" menu item 308 causes the substitution list 201 to be augmented with a source-target pair that includes the typed term 302 (reg. mark) as the source term 310 and the desired symbol 306 (®) as the target term 312.

It should be noted that the substitution list user interface 200 need not be displayed to the user in connection with this particular addition to the substitution list 201. Rather, when the symbols user interface 304 is discontinued, the revised character string 300' is displayed to the user in the current file. The revised character string 300' includes the target term 312 (®), which was substituted for the substituted for the typed term 302 (reg. mark). The target term 312 (®) could be highlighted in the current file, as indicated by the underline 314, which is preferably displayed in red on the monitor 36. It should be understood that the highlighting aspect of the disclosed embodiment is optional, and, in fact, has not been incorporated into commercial embodiments of the present invention to date. It should also be understood that other user interface techniques, such as control items, menu bars, function keys, etc. may also be used to in connection with the disclosed embodiments, as is well known to those skilled in the art. It should also be understood that the highlighting aspect of the disclosed embodiment illustrated in FIG. 3 is optional, and, in fact, has not been incorporated into commercial embodiments of the present invention to date.

OPERATION OF THE DISCLOSED EMBODIMENTS

Figure 4:
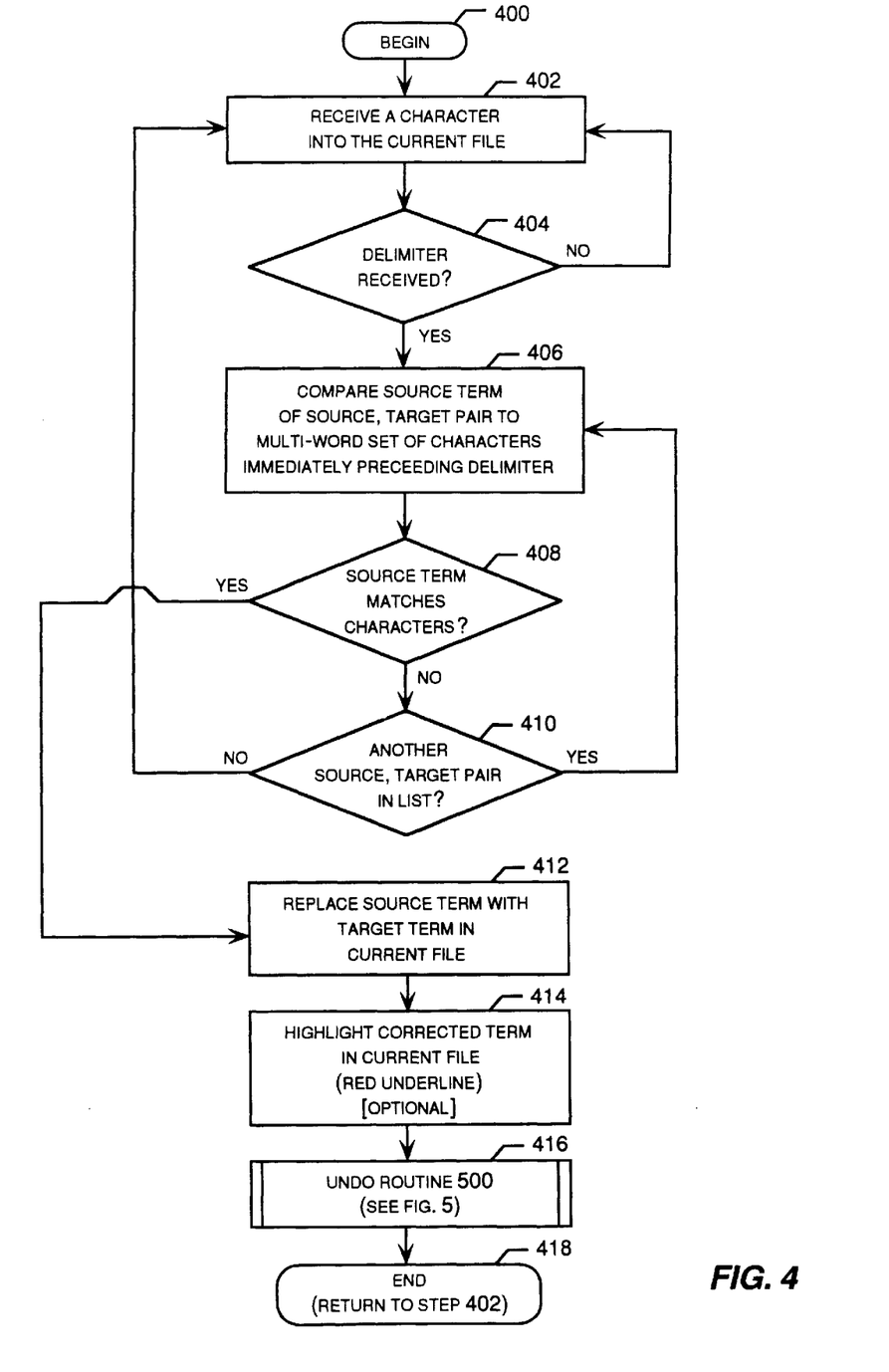
FIG. 4 is a logic flow diagram illustrating a computer-implemented process for automatically altering a document using a substitution list.

FIG. 4 is a logic flow diagram illustrating a computer-implemented process for automatically altering a document using a substitution list. Referring to FIG. 4, the computer-implemented process illustrated by FIG. 4 begins at step 400. In step 402, the computer system 10 receives a character into a current file from the user input/output system 28. A user typically causes the character to be received by depressing a key on the keyboard 30. In step 404, the computer system 10 determines whether the received character is a delimiter character. The computer system 10 preferably recognizes any of the following characters as a delimiter character: hard space ( ), period (.), comma (,), semicolon (;), colon (:), quotation mark ("), single quotation mark ('), exclamation point (!), and question mark (?). If a delimiter character has not been received, the "NO" branch is followed from step 404 to step 402, in which another character is received. The computer system 10 preferably loops through steps 402–404 until a plurality of characters ending with a delimiter character has been received.

If a delimiter character has been received, the "YES" branch is followed from step 404 to step 406, in which a source term of a source-target pair is compared to a multi-word set of characters immediately preceding the delimiter character. The set of characters is multi-word in that the set of characters includes one or delimiter characters, such as the hard space in the data pattern "int he." The source-target pair is an entry in a substitution list, such as the substitution list 201 illustrated in part FIGS. 2A–2D.

In step 408, it is determined whether the source term matches the set of characters immediately preceding the delimiter character. If the source term does not match the set of characters immediately preceding the delimiter character, the "NO" branch is followed from step 408 to step 410, in which it is determined whether there is another source-target in the substitution list 201. If there is another source-target in the substitution list 201, the "YES" branch is followed from step 410 to step 406, in which the next source term in the substitution list 201 is compared to a multi-word set of characters immediately preceding the delimiter character.

The computer system 10 thus loops through steps 406–410 until a source term matches a multi-word set of characters immediately preceding the delimiter character, or until the computer system 10 determines that there is not a source term that matches a multi-word set of characters immediately preceding the delimiter character. If there is not a source term that matches the multi-word set of characters immediately preceding the delimiter character, the "NO" branch is followed from step 410 to step 402, in which another character is received from the user input/output system 28. The computer system 10 thus loops through steps 402–410 until the user inputs a multi-word set of characters that matches a source term in the substitution list 201, or until the user closes the current file. The steps associated with closing the current file, which are well known to those skilled in the art, are not shown on FIG. 4. It will be appreciated that the user may exit the computer-implemented process illustrated in FIG. 4 in many other conventional ways, such as quitting the currently running editing program, turning off the computer system 10, rebooting the computer system 10, etc.

Referring again to step 408, if the source term matches the set of characters immediately preceding the delimiter character, the "YES" branch is followed from step 408 to step 512, in which the matching set of characters in the current file is replaced with the corresponding target term. That is, the target term of the source-target pair replaces the set of characters in the current file that matches the source term of the source-target pair. For example, consider a source-target pair in which the source term is "int he" and the target term is "in the." In this case, the target term "in the" replaces the data pattern "int he" whenever this data pattern occurs in the current file.

Optionally, in step 414, the corrected term may be highlighted in the current file to indicate to the user that a data pattern input by the user has been automatically corrected. Referring again to the example in which the target term "in the" automatically replaces the data pattern "int he" input by the user, the target term "in the" (i.e., the replacement) is highlighted in the current file. The preferred highlight is a red underline, but many other types of highlight may equivalently be used. The highlight, of course, is displayed on the monitor 36 but not included in printed or exported versions of the current file. As noted previously, the highlighting aspect of the disclosed embodiment has not been incorporated into commercial embodiments of the present invention to date. This is because it is currently considered preferable avoid highlighting an automatic replacement so as to avoid drawing the user's attention to the automatic replacement.

Step 414 is followed by the undo routine 500, which is described in detail with reference to FIG. 5. Routine 500 is followed by the end step 418, and the computer-implemented process illustrated by FIG. 4 is concluded. It will be appreciated that the end step 418 preferably returns to step 402, in which another character is received from the user input/output system 28. The computer-implemented process illustrated by FIG. 4 thus loops through the steps 402–416 until the user closes the current file.

Figure 5:
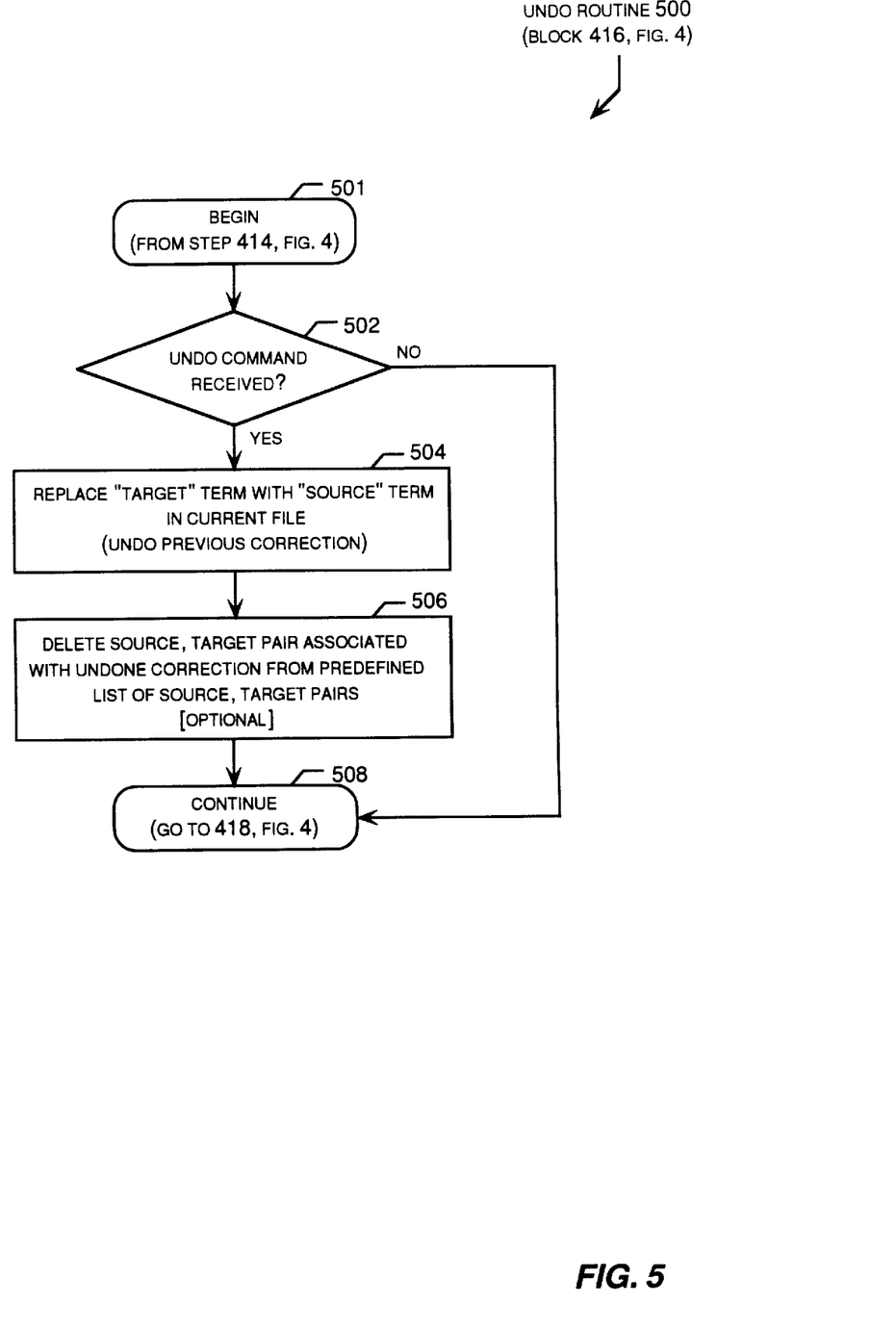
FIG. 5 is a logic flow diagram illustrating a computer-implemented process for reversing an automatic correction.

FIG. 5 is a logic flow diagram illustrating the undo routine 500, which is a computer-implemented process for reversing an automatic correction. The undo routine 500 corresponds to step 416 shown on FIG. 4. The undo routine 500 begins at step 501, which follows step 514 shown on FIG. 4. Referring to FIG. 5, it is determined in step 502 whether an undo command has been received from the user input/output system 28. The user preferably causes an undo command to be received by selecting an undo menu item from a tool bar, as is well known to those skilled in the art. If an undo command has not been received, the "NO" branch is followed from step 502 to the continue step 508, which returns to step 418 shown on FIG. 4. Step 418 preferably returns to step 402, in which another character is received from the user input/output system 28.

If an undo command has been received in step 502, the "YES" branch is followed to the step 504, in which the target term is replaced with the source term in the current file. Referring again to the example in which the target term "in the" automatically replaces the "int he" data pattern input by the user, the undo command causes the source term "int he" to replace the target term "in the" in the current file. That is, the undo command reverses the immediately preceding automatic correction.

Step 504 is followed by step 506, in which the source-target pair associated with the undo command is deleted from the substitution list 201. Thus, using the undo command to reverse an automatic correction disables that particular automatic correction for future occurrences of the source term. It should be understood that this disablement feature of the disclosed embodiment is optional and may be omitted, may be implemented only for the current file, or may be implemented for all files subsequently edited with the current editing program. In addition, activation of the disablement feature may be implemented in connection with additional control features that allow the user to select certain attributes of the disablement feature, as is well known to those skilled in the art. For example, the disablement feature may be implemented in connection with additional steps that prompt the user to confirm a disablement on a case-by-case basis. It should be understood that step 506 is optional, and, in fact, has not been incorporated into commercial embodiments of the present invention to date.

Figure 6:
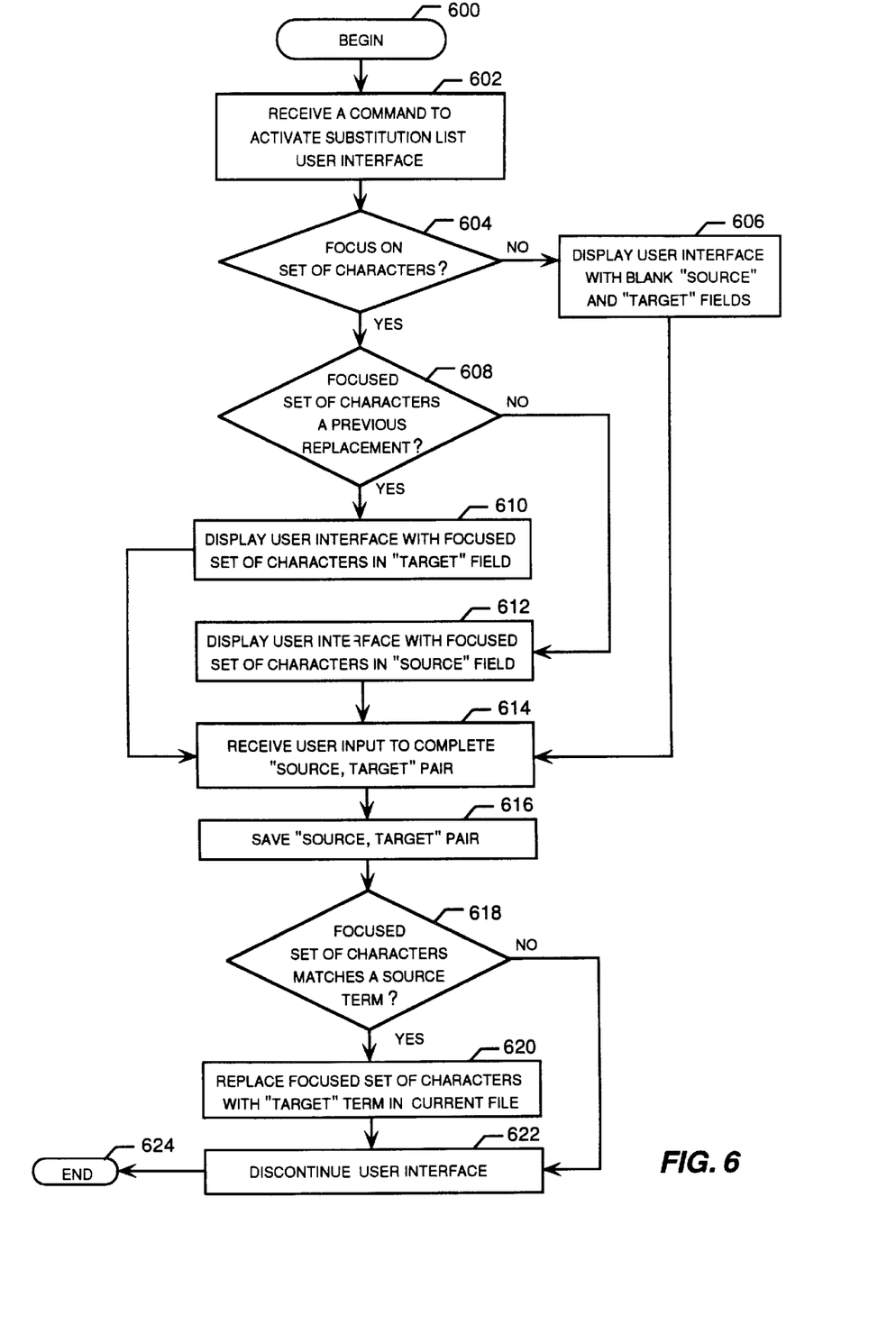
FIG. 6 is a logic flow diagram illustrating a computer-implemented process for a substitution list user interface.

FIG. 6 is a logic flow diagram illustrating a computer-implemented process for a substitution list user interface, such as the grid-type substitution list user interface 200 shown in FIGS. 2A–2D. The computer-implemented process illustrated by FIG. 6 allows a user to add user-defined source-target pairs to the substitution list 201 or to delete source-target pairs from the substitution list 201. Each user may therefore develop a customized substitution list.

Referring to FIG. 6, the computer-implemented process illustrated by FIG. 6 begins at step 600. In step 602, the computer system 10 receives a command from the user input/output system 28 to activate the substitution list user interface 200. A user may preferably cause the activation command to be received by selecting a particular menu item in pull-down menu activated from a tool bar, as is well known to those skilled in the art. Alternatively, a user may cause the activation command by selecting a particular menu item within a symbols user interface, as illustrated in FIG. 3. Other user interface activation methods known in the art may also be used, such as function keys, command plus selection key combinations, control plus selection key combinations, etc.

In step 604, it is determined whether the focus is on a set of characters. A set of characters is typically focused through the point, click, and drag operation of the mouse 32, as is well known to those skilled in the art. If the focus is not on a of characters, the "NO" branch is followed from step 604 to step 606, in which the substitution list user interface 200 is displayed with a blank source-target pair on the top row. In this case, the substitution list user interface 200 also includes a cursor positioned at the first character in the source field so that a source-target pair may be conveniently entered into the substitution list 201. Step 606 is followed by step 614, which is described below.

If the focus is on a set of characters, the "YES" branch is followed from step 604 to step 608, in which it is determined whether the focused set of characters is a previous replacement. In other words, it is determined whether the focused set of characters is a target term that was automatically entered into the current file, as described previously with respect to FIG. 4. If the focused set of characters is a previous replacement, the "YES" branch is followed from step 608 to step 610, in which the substitution list user interface 200 is displayed with the focused set of characters in the target field of the top row. The source term of the source-target pair is displayed in the corresponding source field, and a cursor is positioned at the first character in the source field.

If the focused set of characters is a not previous replacement, the "NO" branch is followed from step 608 to step 612, in which the substitution list user interface 200 is displayed with the focused set of characters in the source field of the top row. In this case, the corresponding target field is left blank, and a cursor is positioned at the first character in the target field. Steps 606, 610, and 612 are all followed by step 614, in which the computer system 10 receives data from the user input/output system 28 to complete a source-target pair. Conventional editing tools, such as cursor control commands, cut-and-paste commands, copy and delete commands, etc. operate in connection with the substitution list user interface 200 to allow the user to easily edit the substitution list 201. It should be understood that once the user has accessed the substitution list 201, the user may edit and create any number of source-target pairs of the substitution list 201.

In step 616, upon receipt of a predefined command from the user input/output system 28, the edited substitution list 201 is saved in the system memory 40. The edited substitution list 201 may include a source-target pair having a source term that matches a focused set of characters in the current file. Step 616 is followed by step 618, in which it is determined whether the focused set of characters matches a source term of a source-target pair of the edited substitution list 201. If the answer to the inquiry of step 616 is yes, the "YES" branch is followed to step 620, in which the focused set of characters in the current file is automatically replaced with the target term of the corresponding source-target pair. Step 620, and the "NO" branch from step 618, are followed by step 622, in which the substitution list user interface 200 is discontinued. Step 622 is followed by the end step 624, and the computer-implemented process illustrated by FIG. 6 is completed. It will be appreciated the end step 624 preferably returns to step 402 shown on FIG. 4 so that the user may continue editing the current file. It should be understood that the aspect of the disclosed embodiment illustrated in FIG. 6 is optional, and, in fact, has not been incorporated into commercial embodiments of the present invention to date.

In view of the foregoing, it will be appreciated that the present invention provides an editing system operable for detecting and correcting multi-word data entry errors that operates as a integral part of an "AUTOCORRECT" engine. A convenient user interface is provided for accessing a substitution list, and convenient tool bars and menu items are provided for activating the user interface. It should be understood that the foregoing relates only to the preferred embodiments of the present invention, and that numerous changes may be made therein without departing from the spirit and scope of the invention as defined by the following claims.

TABLE I

| Source | Target |
|---|---|
| you're own | your own |
| don't no | don't know |
| your a | you're a |
| your the | you're the |
| your an | you're an |
| your my | you're my |
| your his | you're his |
| your her | you're her |
| your their | you're their |
| your your | you're your |
| they're is | there is |
| they're | there are |
| their is | there is |
| their are | there are |
| there's is | theirs is |
| there's are | theirs are |
| its a | it's a |
| its the | it's the |
| may of been | may have been |
| might of been | might have been |
| must of been | must have been |
| could of been | could have been |
| should of been | should have been |
| must of hand | must have had |
| shall of been | shall have been |
| will of been | will have been |
| can't of been | can't have been |
| might of hand | might have had |
| could of had | could have had |
| would of had | would have had |
| will of had | will have had |
| may of had | may have had |
| should of had | should have had |
| shall of hand | shall have had |
| oft he | of the |
| in the | in the |
| thatt he | that the |
| andt he | and the |
| att he | at the |
| ont he | on the |
| byt he | bye the |
| saidt he | said the |
| againstt he | against the |
| aftert he | after the |
| ift he | if the |
| undert he | under the |
| fromt he | from the |
| ast he | as the |
| whent he | when the |
| witht he | with the |
| whicht he | which the |
| askt he | ask the |
| askedt he | asked the |
| toldt he | told the |
| tellt he | tell the |

TABLE I-continued

| Source | Target |
| --- | --- |
| would of been | would have been |
| deja vu | déjà vu |

What is claimed is:

1. In a computer system comprising a processing unit, a memory storage device, a user input/output system including a monitor, and an editing program module including instructions which, when executed by the processing unit, cause the computer system to edit a current file, a method for altering the content of the file comprising the steps of:

receiving a plurality of characters from the user input/output system;

detecting among the plurality of characters an internal delimiter character indicating that the plurality of character includes more than one word; and in response to detecting the delimiter character, retrieving from the memory storage device a multi-word source term of a source-target pair comprising the source term and a target term, comparing the source term to a multi-word set of characters immediately preceding the delimiter character, and if the source term matches the set of characters immediately preceding the delimiter character, then retrieving the target term from the memory storage device, and in the current file, replacing the set of characters immediately preceding the delimiter character with the target term.

2. The method of claim 1, further comprising the steps of:

displaying on the monitor a portion of the current file including the plurality of characters received from the user input/output system; and within the display, replacing the set of characters immediately preceding the delimiter character with the target term, and highlighting the target term.

3. The method of claim 1, wherein the source term is a first source term relating to a first common data entry error, and the target term is a first target term comprising a correction for the first common data entry error, further comprising the steps of:

if the first source term does not match the multi-word set of characters immediately preceding the delimiter character, then retrieving a second source term from the memory storage device relating to a second common data entry error;

comparing the second source term to the multi-word set of characters immediately preceding the delimiter character, and if the second source term matches the multi-word set of characters immediately preceding the delimiter character, then retrieving a second target term associated with the second source term from the memory storage device, the second target term comprising a correction for the second common data entry error, and in the current file, replacing the multi-word set of characters immediately preceding the delimiter character with the second target term.

4. The method of claim 1, wherein the target term comprises a multi-word set of characters.

5. The method of claim 1, wherein the target term comprises a symbol.

6. The method of claim 1, wherein:

the source term comprises a common spelling or grammatical error; and the target term comprises a correction for the common spelling or grammatical error.

7. The method of claim 1, wherein:

the source term comprises a common contextual error; and the target term comprises a correction for the common context error.

8. The method of claim 1, wherein:

the source term comprises a common possessive form error; and the target term comprises a correction for the common possessive form error.

9. The method of claim 1, wherein:

the source term comprises a common inadvertent data entry error; and the target term comprises a correction for the common inadvertent data entry error.

10. The method of claim 1, wherein:

the source term comprises a common three word grammatical error; and the target term comprises a correction for the common three word grammatical error.

11. The method of claim 1, wherein:

the source term comprises a word requiring an omitted accent symbol; and the target term comprises a correction for the word including the accent symbol.

12. A computer-readable medium storing an editing program module comprising instructions which, when executed by a computer system comprising a processing unit, a memory storage device, and a user input/output system including a monitor, cause the computer system to perform the steps of:

editing a current file by receiving a plurality of characters from the user input/output system;

receiving a command from the user input/output system to focus a multi-word set of the characters including an internal delimiter character indicating that the multi-word set of the characters includes more than one word;

receiving a command from the user input/output system to activate a multi-word correction user interface;

displaying a multi-word correction user interface on the monitor;

defining the focused set of the characters to be a source term of a source-target pair comprising the source term and a target term;

displaying the focused set of the characters in the source field of the source-target pair;

receiving data from the user input/output system defining the target term;

displaying the target term in the target field of the source-target pair;

receiving an indication from the user input/output system that the source-target pair is complete; and in response to the indication, replacing the focused set of the characters with the target term in the current file, and storing the source-target pair in the memory storage device in a file comprising a substitution list comprising a plurality of source-target pairs.

13. The computer-readable medium of claim 12, wherein the step of receiving a command from the user input/output system to activate a multi-word correction user interface further comprises the steps of:
receiving a command from the user input/output system to activate a symbols user interface;
displaying the symbols user interface including a menu item for activating the multi-word correction user interface; and
receiving a command from the user input/output selecting the menu item from the symbols user interface for activating the multi-word correction user interface.

14. The computer readable medium of claim 12, further comprising the steps of:
after the step of storing the source-target pair in the substitution list,
receiving a plurality of characters from the user input/output system;
receiving from the user input/output system an internal delimiter character indicating that the plurality of characters includes more than one word; and
in response to detecting the delimiter character,
retrieving the source tern from the memory storage device;
comparing the source term to a multi-word set of characters immediately preceding the delimiter character, and
if the source term matches the multi-word set of characters immediately preceding the delimiter character, then
retrieving the target term from the memory storage device, and
in the current file, replacing the multi-word set of characters immediately preceding the delimiter character with the target term.

15. The computer readable medium of claim 12, further comprising the steps of:
after the step of storing the source-target pair in the substitution list,
receiving a plurality of characters from the user input/output system;
receiving from the user input/output system an internal delimiter character indicating that the plurality of characters includes more than one word;
in response to detecting the delimiter character,
retrieving the source term from the memory storage device,
comparing the source term to a multi-word set of characters immediately preceding the delimiter character,
determining that the source term matches the multi-word set of characters immediately preceding the delimiter character,
retrieving the target term from the memory storage device, and
in the current file, replacing the multi-word set of characters immediately preceding the delimiter character with the target ten;
receiving a command from the user input/output system to focus the target term;
receiving a command from the user input/output system to activate the multi-word correction user interface;
displaying the multi-word correction user interface on the monitor;
displaying the target term in the target field of the source-target pair;
displaying the source term in the target field of the source-target pair;
receiving data from the user input/output system altering the target term;
receiving a indication from the user input/output system that the source-target pair is complete; and
in response to the indication,
replacing the focused multi-word set of the characters with the altered target term in the current file, and
replacing the target term with the altered target term in the substitution list.

16. An editing system comprising:
a computer system including a processing unit, a memory storage device, and a user input/ output system including a monitor; and
an editing program module including instructions which, when executed by the processing unit, cause the computer system to perform the steps of:
editing a current file by receiving a plurality of characters from the user input/output system;
receiving from the user input/output system an internal delimiter character indicating that the plurality of characters includes more than one word; and
in response to detecting the delimiter character,
retrieving the source term of a source-target pair comprising the source term and a target term from a substitution list of source-target pairs within the memory storage device;
comparing the source term to a multi-word set of characters immediately preceding the delimiter character, and
if the source term matches the multi-word set of characters immediately preceding the delimiter character, then
retrieving the target term of the source-target pair from the memory storage device, and
replacing the multi-word set of characters immediately preceding the delimiter character with the target term in the current file;
receiving an undo command from the user input/output system; and
in response to the undo command,
replacing the target term with the source term in the current file; and
deleting the source-target pair from the substitution list.

17. A editing system, comprising:
a program module including computer executable instructions for causing a computer system to receive a plurality of characters; and
means for automatically correcting a predefined set of multi-word data entry errors in the plurality of characters, each multi-word data entry error including an internal delimiter character indicating that the multi-word data entry error includes more than one word.

18. The editing system of claim 17, wherein the means for automatically correcting a predefined set of multi-word data entry errors further comprises:
a pre-programmed substitution list comprising a set of source-target pairs wherein the source term of a source-target pair defines a predefined multi-word data entry error, and wherein the target term of the source-target pair defines a predefined correction for the multi-word data entry error; and means for augmenting the pre-programmed substitution list with a user-defined multi-word data entry error.

19. The editing system of claim 18, wherein the pre-programmed substitution list comprises at least one source-target pair selected from each of the following classes of data entry errors:

common contextual errors;

possessive form errors;

common inadvertent data entry errors;

common three word grammatical errors; and omitted accent symbols.

20. The editing system of claim 19, further comprising:

means for receiving a command to undo the step of automatically replacing the detected set of characters with a corrected set of characters; and in response to the undo command, undoing the step of automatically replacing the detected set of characters with a corrected set of characters; and deleting the detected set of characters from the pre-defined set of multi-word data entry errors.

* * * * *